United States Patent [19]
Campbell

[11] 3,727,280
[45] Apr. 17, 1973

[54] METHOD OF FABRICATING A SPHERICAL BEARING

[76] Inventor: James R. Campbell, 31301 Camel Point Drive, South Laguna, Calif. 92677

[22] Filed: Dec. 29, 1971

[21] Appl. No.: 213,487

Related U.S. Application Data

[63] Continuation-in-part of Ser. No. 39,579, May 22, 1970, Pat. No. 3,680,930.

[52] U.S. Cl. ............................. 29/149.5 B, 29/441
[51] Int. Cl. ........................ B21d 53/10, B23p 11/00
[58] Field of Search .................. 29/149.5 B, 149.5 R, 29/149.5 NM, 148.4 A, 441

[56] References Cited

UNITED STATES PATENTS 1,745,704  2/1930  Muncy ........................... 29/149.5 B

*Primary Examiner*—Thomas H. Eager
*Attorney*—Thomas M. Small

[57] ABSTRACT

The method of fabricating a rod-end bearing comprising a socket member or "banjo" defining an internal annular race of spherically concave curvature, open on both sides, and a spherical bearing member or ball in the socket, in which the socket member is formed in one integral piece with the openings smaller than the diameter of the ball, and the ball is formed as a helix comprising convolutions that are free to deflect and that have outer edges defining a spherically generated surface sized to fit closely within the socket, the ball being inserted by placing one end portion of the helix against one of the openings and relatively rotating the ball and the socket member to thread the ball into the socket. The helix is wound from strip material, by conventional spring-winding techniques, in a cylindrical form which then is spherically machined, or alternatively, is formed by machining a spiral groove around a cylindrical blank, stripping the helix from the flank, and machining a spherical surface thereon. The convolutions are secured together, after the ball is in the socket, by placing a bushing through a bore in a ball and clamping the ball between the ends of the bushing.

12 Claims, 17 Drawing Figures

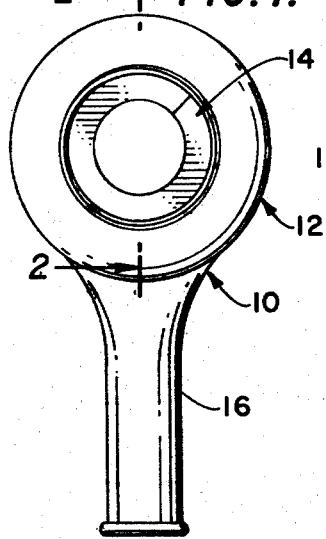
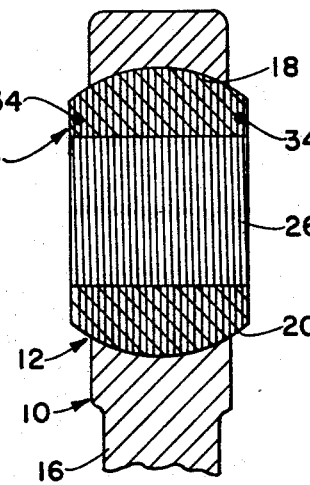
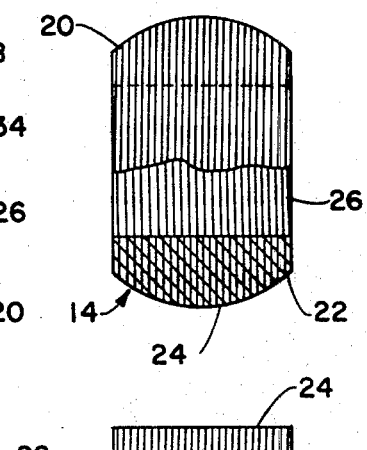
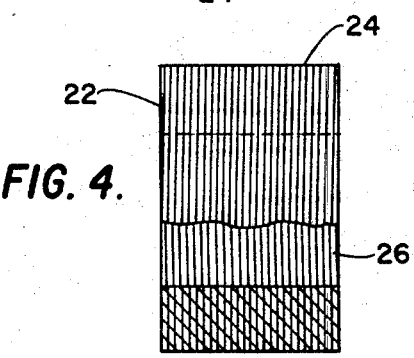
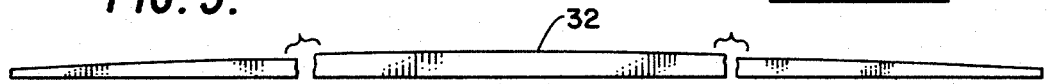
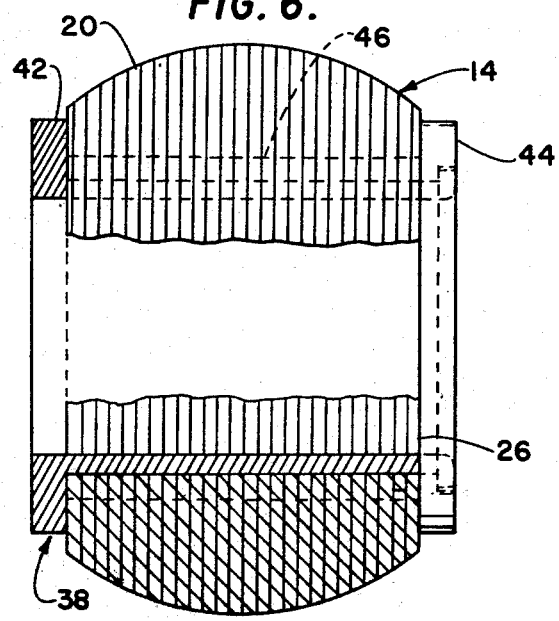
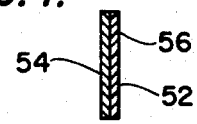

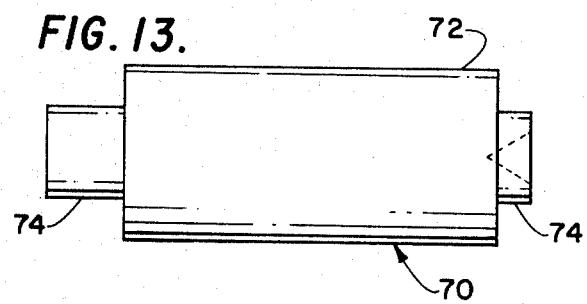
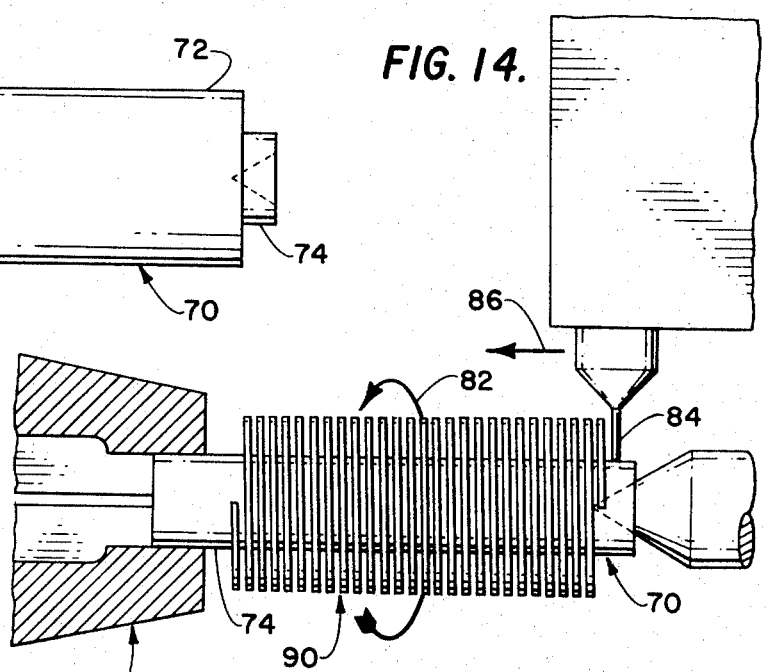
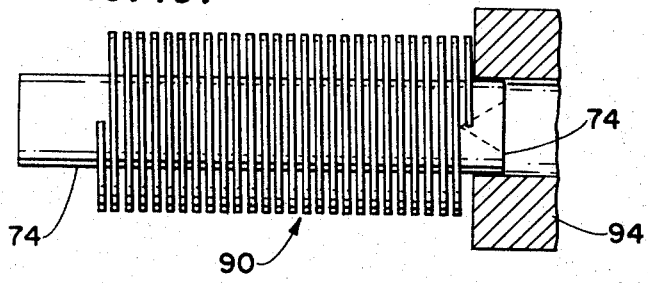
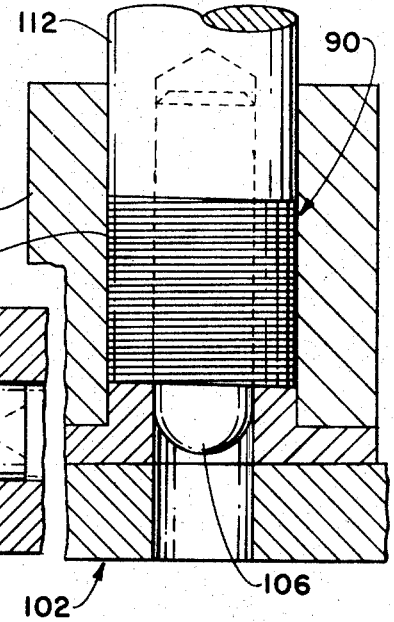
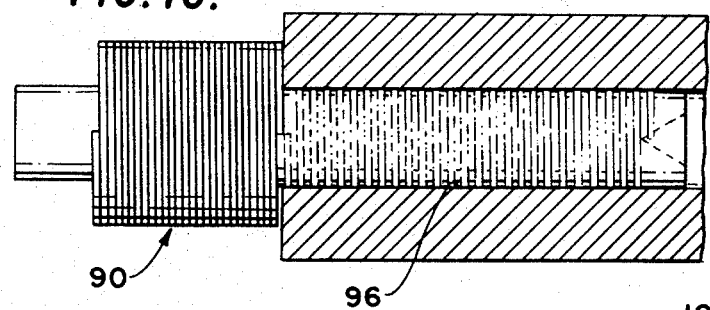

METHOD OF FABRICATING A SPHERICAL BEARING

CROSS-REFERENCE TO RELATED APPLICATION

This is a continuation-in-part of copending application Ser. No. 39,579, filed May 22, 1970 now U.S. Pat. No. 3,680,930, issued Aug. 1, 1972.

BACKGROUND OF THE INVENTION

This invention relates to a method of fabricating a so-called spherical bearing, and relates particularly to the fabrication of bearings of the ball-and-socket type wherein the socket incorporates a spherically-generated race and wherein the race is adapted to receive a correspondingly generated spherical ball member, it being understood that both race and the ball typically have bearing surfaces that are annular parts of spheres and that the term "spherical" is used herein to include part-spherical surfaces.

Devices of this type are frequently incorporated in structures known as rod-end bearings wherein the ball and socket are connected to the extremity of a rod or linkage to provide a universal connection with another object. They are used extensively in controlled linkage systems and other mechanisms to provide articulated joints between the links, levers and the like with which they are associated. The spherical ball-and-socket construction has the advantage of providing, within predetermined limits, universal angulation or swivelling of the linkage members.

Spherical bearings of this type eliminate looseness and slop by virtue of their relatively large bearing surfaces and their relatively precise fit. In addition, the angulation or swivel action provided by such bearings eliminates binding and undesirable loads from linkage systems in which they are incorporated.

There are numerous spherical bearings on the market at the present time, but all of them appear to have deficiencies which detract seriously from their prolonged satisfactory performance. Most such bearings are assembled by press-fitting or swaging operations, under heavy pressure, and because of the difficulty of controlling the swaging process, the spherical member frequently is too loosely or too tightly confined in the socket. Of greater importance is the lack of true sphericity in the surface of the socket.

If the spherical bearing member is too tightly fixed in the corresponding spherical socket, excessive wear, stiffness of movement and premature failure of the bearing will occur. Similarly, if the spherical bearing member is too loosely secured in the socket, undesirable looseness in the linkage will exist, accompanied by excessive play of the spherical bearing in the socket and consequent fretting and premature failure.

Another disadvantage of swaged spherical bearings is the fact that, once the spherical member becomes worn, it is impossible to remove and replace the worn bearing with a new bearing. Also, metals suitable for swaging are not necessarily those best suited for particular applications where anti-galling characteristics, elevated temperatures or other ambient phenomena of an extreme nature may be encountered.

As an alternative to swaging, some ball-and-socket bearings are fabricated by providing a slot in a side wall of the socket and inserting a suitably formed, part-spherical bearing through the slot. Subsequently, the bearing is turned in the socket to prevent it from being released therefrom without being deliberately turned back to the assembly position. Unfortunately, this type of construction produces undesirable stress concentrations around the socket and creates a substantial loss of bearing area.

Another alternative is to form the socket in two mating parts that are fitted together around a ball. This, of course, requires multiple parts for the socket member, as well as suitable fastening means, and is less satisfactory in these respects than a bearing having a one-piece socket member.

SUMMARY OF THE INVENTION

The present invention resides in a method of fabricating a spherical bearing of the foregoing general character in which the ball is inserted into the socket through an opening smaller than the ball, thereby permitting the use of a one-piece, preformed socket member in which the socket may be formed with high precision, thus eliminating the disadvantages of prior bearings with swaged sockets, split two-piece sockets, excessive stress concentrations, and the like. Moreover, the ball fabricated in accordance with the invention may be readily removed through an opening into the socket smaller than the ball, after wear or damage occasioned by use, and replaced by a new ball, without necessity for discarding the entire assembly.

To these ends, the invention comprises, in general, the steps of: (1) forming a socket member having a socket defining a spherical race of a preselected diameter and having an opening into at least one side of the socket smaller than the diameter of the race; (2) forming a ball in the form of a helix with convolutions free to deflect and having outer edges shaped to define a spherical outside surface that is sized to fit the socket, the ball being formed with a diameter larger than the opening into the socket; and (3) inserting the ball into the socket by placing one end portion of the helix against the opening into the socket, to bring the helix into engagement with the edge on the socket number defining the opening, and rotating or revolving the ball relative to the socket member to turn successive convolutions of the helix into the socket. In effect, the ball is "screwed" into the socket as successive convolutions are drawn away from the outside portion of the ball and into the socket, and the convolutions resume their original configuration to reform the ball inside the socket.

Accordingly, both the ball and the socket can be precisely formed to the proper sphericity and dimensions for a precision fit while apart, and even to be preloaded, if desired, and this precision fit is maintained when assembled. A more detailed feature resides in a particularly advantageous method of fabricating the ball, in which the helix is created by machining a spiral groove around an elongated blank, stripping the helix off the blank, compressing the spaced turns of the helix thus formed, and machining a spherical surface on the helix.

In addition, the convolutions of the helix are secured together after installation of the ball in the socket, herein by inserting a bushing into a bore which is defined by the inner edges of the helix, and clamping the helix between flanges on the ends of the bushing.

The bushing may be spline-coupled to the ball, and provides a coupling for receiving a shaft, bolt or other member to be connected to the socket member through the ball.

Other objects and aspects of the invention will be apparent from the following specification and the accompanying drawings which are for the purpose of illustration only.

BRIEF DESCRIPTION OF THE DRAWINGS

FIG. 1 is a side elevational view of a spherical bearing fabricated in accordance with the invention;

FIG. 2 is a vertical sectional view taken on the broken line 2—2 of the FIG. 1;

FIG. 3 is a side elevational view, partly broken away and shown in cross-section, of the ball of the spherical bearing;

FIG. 4 is a side elevational view, partly broken away and shown in cross-section, of the compressed helix prior to the generation of a spherical surface thereupon to form the ball of FIG. 3.

FIG. 5 is a developmental view showing a typical reduction in the radial width of the strip forming the helix, after the generation of the spherical surface thereon;

FIG. 6 is an enlarged, partly cross-sectional view of the ball, with a bushing inserted therein, it being understood that the bushing is to be inserted in the ball only after the insertion of the ball in the socket;

FIG. 7 is an enlarged view showing the cross-section of a typical laminated metallic composite strip material adapted to be utilized in the helix;

FIG. 8 is an enlarged sectional view similar to FIG. 7 but showing a different laminated composite strip;

FIG. 13 is a side elevation of a substantially cylindrical blank of metal utilized in fabricating a helix from which the helical ball can be formed;

FIG. 14 is a view partly in section and partly in side elevation illustrating the cutting of the helix on the blank;

FIG. 15 is a view similar to FIG. 14 illustrating the severing of the helix from the core of the blank.

FIG. 16 is a view similar to FIG. 15 illustrating the severance of the helix from the core; and FIG. 17 is a view partly in section and partly in side elevation illustrating the compressing of the helix prior to the spherical machining thereof.

DETAILED DESCRIPTION

Figure 9:
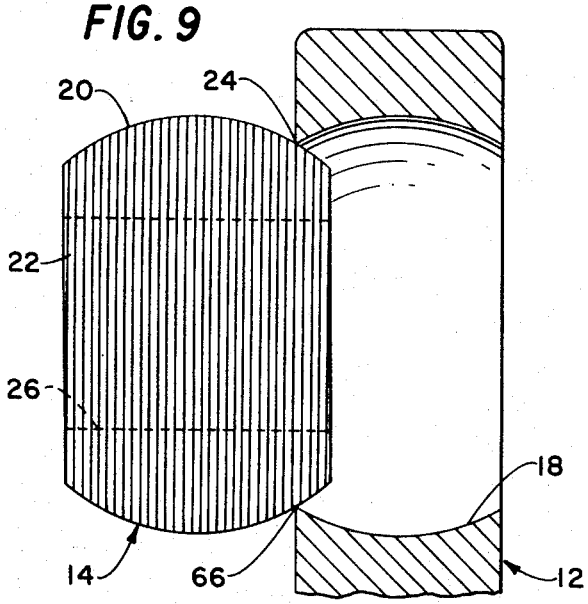
FIG. 9 is an enlarged fragmentary view similar to parts of FIG. 2 showing the ball in side elevation and the socket member in cross-section, during the initial insertion of the ball into the socket.

In FIGS. 1–3 of the drawings is a ball-and-socket rod-end bearing 10 which is fabricated in accordance with the invention and includes a housing or socket member 12, and a ball 14 mounted in the socket member. The illustrative socket member is a one-piece, so-called "-banjo" comprising a ring and an integral extension 16 on one side of the ring, which may be threaded or otherwise configured to receive the corresponding extremity of a rod, link or other element intended to have the rod-end bearing 10 mounted thereupon.

Inside the ring is a spherically configured race 18 for engagement with the correspondingly spherically configured outer surface 20 of the ball 14. The ring has a circular opening on each side, opening into the socket and smaller in diameter than the diameter of the race, which thus is annular in shape. Between the two side openings, the race is concave in cross-section.

The ball 14 comprises a continuous helix 22, the convolutions 24 of the helix being disposed in side-by-side relation with each other and having outer sides cooperating to define the spherical surface 20, while being axially yieldable relative to each other. The inner sides of the convolutions 24 define a bore 26 through the ball for the reception of a corresponding shaft or bolt shank or other suitable shaped member adapted to be inserted therein.

The helix may be fabricated from strip material by conventional spring-winding techniques, may be machined as a spiral on a suitable blank, as hereinafter described, or might be formed in other ways, such as injection molding of suitable plastics. If the material is metal, as is presently preferred, it can be wound as a flat wound spring so long as the metal has sufficient elongation to accommodate the transverse bowing required. If the material is extremely hard and has relatively low permissible elongation, the machining method, to be described, may be utilized.

In any event, after the fabrication of the helix, usually in the cylindrical configuration shown in FIG. 4 of the drawings, the spherical surface 20 is ground or cut upon the helix while it is maintained in the condition shown in FIG. 4. Because the spherical surface 20 is formed by machining the same upon the external surface of the helix, extremely close tolerances may be maintained for a precision fit between the race 18 of the socket member 12 and the surface 20 of the ball 14.

After the generation of the spherical surface 20 on the helix 22, the ball 14 is ready for insertion into the race 18 of the socket member 12. If the corresponding convolutions 24 of the helix 22 were unwound into a flat strip, the development would be similar to that shown in the strip 32 of FIG. 5 wherein the extremities of the strip are the narrowest portions of the strip and the intermediate portion of the strip is the thickest, forming the intermediate section of the ball 14. The thickness of the strip, axially of the helix, is constant.

Preferably, the opposite sides of the ball 14 are ground to reduce deformation of the terminal convolutions 24 of the helix 22 when the helix is compressed. The ends may be spot-welded to the adjacent convolutions 24, as best shown at 34 in FIG. 2 of the drawings to provide stability of the ends.

The ball 14 is shown in FIG. 6 as having a cylindrical bushing 38 mounted in the bore 26 thereof. The bushing has a preformed flange 42 abutting the left-hand side of the ball, and the right-hand end of the bushing is swaged over a washer 44 to clamp the washer against the right-hand side of the ball, so that the bushing backs up the convolutions of the helix 22 and also clamps these convolutions together. To prevent relative rotation between the bushing 38 and the helix, the bushing is provided with one or more splines 46 which are engaged in corresponding grooves formed in the wall of the bore 26.

This insures that the rotation of a shaft within the bushing will not distort the ball 14. Further, the bushing maintains the adjacent convolutions of the helix 22 in engagement with one another to maintain the spherical surface 20 in engagement with the race 18, particularly in applications wherein it is desired to have little or no bolt-up load on the ball.

It is also contemplated that the strip from which the helix 22 is fabricated may be coated with various types of materials, such as trifluroethylene, to provide self-lubricating characteristics, or that the strip may be coated with other types of semi-permanent lubricants, such as lubricants incorporating molybdenum disulphide.

Moreover, bimetallic spring strips, such as the strip 52, shown in FIG. 7 of the drawings, may be utilized to achieve desirable bearing action resulting from the cooperative relationship of metal laminations 54 and 56. In addition, end laminations such as the end lamination 62 may be provided on a strip 64 as shown in FIG. 8.

Figure 10:
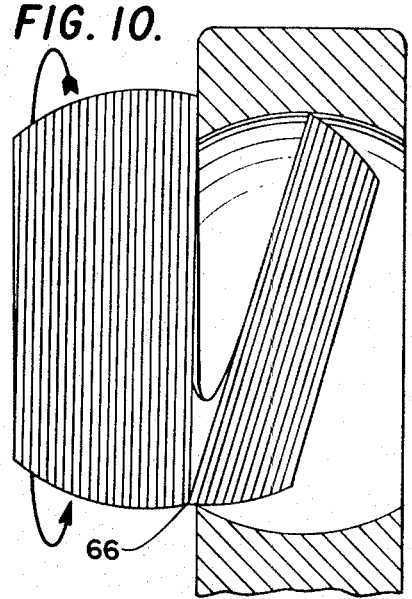
FIG. 10 is a similar view showing the further insertion of the ball.
Figure 11:
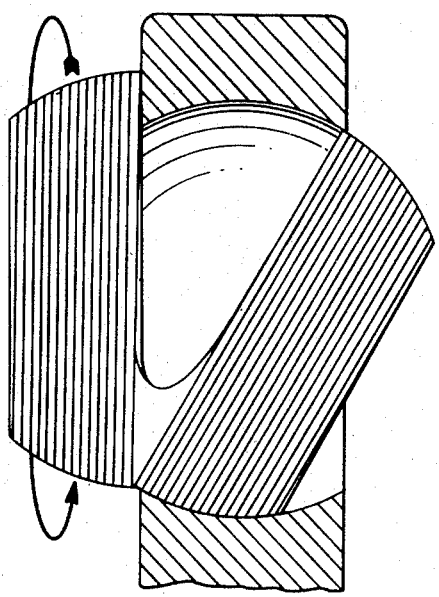
FIG. 11 is a similar view showing continued insertion of the ball.
Figure 12:
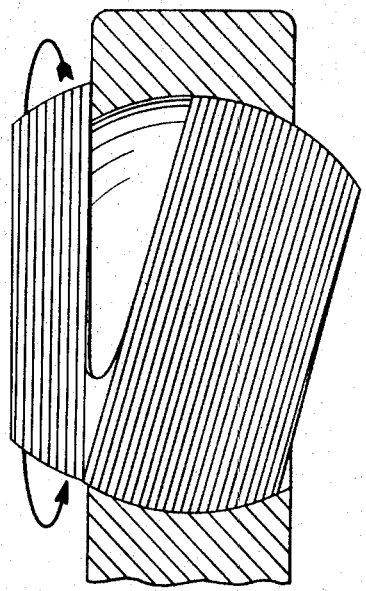
FIG. 12 is a similar view showing almost complete insertion of the ball.

The successive steps of insertion of the ball 14 into engagement with the race 18 of the socket member 12 are illustrated in FIGS. 9-12 of the drawings. Initially, the right-hand side of the ball 14 is placed into one of the side openings of the socket to bring one of the convolutions 24 of the helix 22 into engagement with the corresponding edge 66 defining the opening into the socket. Relative rotation of the socket member and the ball in this condition causes "threading" engagement of the edge 66 with successive convolutions of the helix to draw the convolutions successively into the socket. Inside the socket, the convolutions resume, or are restored to, their original configuration to reform the ball.

During such drawing, each convolution yields away from the next adjacent convolution and is fed into the socket and into engagement with the other convolutions previously drawn in. It should be noted that the relative rotation can be bodily rotation of the ball in a tight circle about the axis of the bore 26, and that insertion of the ball into the socket can be accomplished with a mandrel which fits within the bore 26. This can be a hand tool, or the insertion of the ball can be accomplished by suitable automatic devices. For most applications, the convolutions of the helix 22 are left-hand wound for use with right-hand threaded bolts and standard machine tool configurations.

The method of the invention includes the fabrication of the helix of the ball 14 from materials of low elongation and considerable hardness, such as titanium alloys, stellite, and the like. For such materials, a novel method of helix fabrication is shown successively in FIGS. 13-17 of the drawings, and begins with the provision of a blank 70 of the desired material, preferably having a central cylindrical portion 72 from which the helix is to be cut. Reduced diameter extremities 74 on the blank correspond to the rough diameter of the bore to be formed in the helix.

Such a blank is mounted in a turning machine indicated generally at 80, and is rotated in the direction of the arrow 82 to be engaged by a cutter or grinding means 84 traveling longitudinally in the direction of the arrow 86 to cut a spiral groove around the blank, thereby forming a cylindrical helix 90 with spaced convolutions internally joined to a core. It should be noted that the helix 90 (FIG. 14) is right-hand wound.

After the cutting of the cylindrical helix 90 has been completed, the blank 70 is placed in a die which includes a ram 94 (FIG. 15). The ram moves over the adjacent reduced extremity 74 of the blank 70, and against the adjacent end of the helix 90, and then strips the helix 90 from th resultant core 96 (FIG. 16).

The helix 90 then is placed in a compacting or compressing die 102 (FIG. 17) in which the successive convolutions or turns 104 thereof are driven into positive engagement with one another. The die has a pilot 106, a die ring 108, and a punch 112 for compressing the helix within the ring, the pilot being slightly undersized and the ring slightly oversized, to allow a small amount of metal flow as the punch compresses the helix 90. This metal flow will increase the outer diameter of the helix while reducing the diameter of the bore therein.

After the compacting step has been accomplished, the bore 26 may be machined in the helix, and the last convolution at each extremity is ground to provide a substantially vertical surface at each extremity and a precise bearing width, if desired, after welding of the extremities of the helix to the adjacent convolutions. The helix then is placed on a spherical grinder and the rough sphericity of the ball 14 is achieved by grinding. A more precisely finished spherical ball may be achieved by further grinding, burnishing or lapping. After any coating or lubricating steps that are desired, the ball can be threaded into the socket member 12 and the bushing 38 inserted in the bore 26.

The present invention thus provides a ball-and-socket bearing wherein the ball is constituted by a helix which is threadedly engaged in the race of the socket member and may be threadedly removed therefrom. The elimination of the need for swaging of the socket member to confine the ball member therein permits the utilization of any desired and precisely preformed material for the socket member. In addition, the ball may be precisely formed within close tolerances for a precision fit between the spherical surface of the ball and the race of the socket member. Moreover, because the assembly of the components of the ball-and-socket bearing does not entail the modification of the structure of either the ball or the socket, a wide variety and range of materials can be used.

It will be apparent that, while a specific bearing and sequence of operations have been illustrated and described, the invention may be used in the fabrication of other bearings and modifications may be made in the sequence of operations without departing from the spirit and scope of the invention.

I claim:

1. The method of fabricating a spherical bearing comprising the steps of:
    forming a socket member as a single, integral piece with an internal annular race of spherically concave curvature and with an opening into each side of said race smaller than the diameter of the race;
    forming a helix with side-by-side convolutions free to deflect axially relative to each other;

shaping the outer edges of said convolutions to define a spherical surface larger in diameter than said openings, and shaping the inner edges to define a bore through said helix;

inserting said helix in said race by placing one end portion of the helix into one of said openings and relatively rotating the socket member and the helix to turn successive convolutions into the race;

and securing said convolutions together after insertion of the helix into said race.

2. The method as defined in claim 1 in which the securing step is accomplished by placing a bushing in the bore of said helix, and clamping the convolutions together between the ends of the bushing.

3. The method of fabricating a spherical bearing comprising the steps of:

forming a socket member having a spherically generated socket of preselected diameter and an opening into at least one side of said socket smaller than said preselected diameter;

forming a ball as a helix comprising convolutions free to deflect and having outer edges defining a spherically generated outside surface sized to fit closely in said socket, said ball being formed with a diameter larger than said opening;

and inserting said ball into said socket by placing one end portion of said helix against the opening to bring the helix into engagement with the socket member, and relatively rotating the ball and the socket member to turn successive convolutions of said helix into said socket.

4. The method as defined in claim 3 in which the ball-forming step is accomplished by first forming a generally cylindrical helix, and machining said outside surface thereon while maintaining said convolutions in a preselected relation.

5. The method as defined in claim 3 in which the ball-forming step is accomplished by first forming a spiral groove around a generally cylindrical blank to form a helix with spaced convolutions extending around a central core, stripping said helix from said core, compressing said convolutions, and machining said outside surface thereon while maintaining said convolutions in a preselected relation.

6. The method as defined in claim 3 including the further step of securing said convolutions together after insertion of said ball in said socket.

7. The method as defined in claim 6 in which said further step is accomplished by forming a bore through said ball, and, after insertion of said ball in said socket, inserting a bushing in said bore and clamping said convolutions between the ends of the bushing.

8. The method as defined in claim 3 in which said outside surface is spherically generated while said convolutions are compressed tightly together, and including the further step of compressing said convolutions tightly together after insertion of said ball in said socket.

9. The method as defined in claim 3 in which said ball-forming step is accomplished by winding a strip of material into said helix.

10. The method as defined in claim 9 in which said strip is wound into a generally cylindrical helix, and the spherical surface is machined on the helix.

11. The method as defined in claim 3 in which said ball is formed initially with generally flat sides by a helix of substantially constant thickness in each convolution, and with the ends of the helix exposed at said flat sides, and including the further step of flattening the said ends and said sides substantially into planar surfaces.

12. The method as defined in claim 11 in which said flattening step is accomplished by securing said ends at least to the adjacent convolutions, and machining said ends to feather edges.

* * * * *